US010139036B2

(12) United States Patent
Wiethorn

(10) Patent No.: US 10,139,036 B2
(45) Date of Patent: Nov. 27, 2018

(54) SECUREMENT FOR CRAWLER CRANES AND SYSTEM AND METHOD FOR USE OF SAME

(71) Applicant: Jim D. Wiethorn, Sugar Land, TX (US)

(72) Inventor: Jim D. Wiethorn, Sugar Land, TX (US)

(*) Notice: Subject to any disclaimer, the term of this patent is extended or adjusted under 35 U.S.C. 154(b) by 98 days.

(21) Appl. No.: 15/593,693

(22) Filed: May 12, 2017

(65) Prior Publication Data

US 2017/0328511 A1  Nov. 16, 2017

Related U.S. Application Data

(60) Provisional application No. 62/335,577, filed on May 12, 2016.

(51) Int. Cl.
*F16M 3/00* (2006.01)
*F16M 5/00* (2006.01)
*B66C 23/78* (2006.01)
*B65D 19/22* (2006.01)
*B65D 19/38* (2006.01)
*B66C 6/00* (2006.01)
*B66C 23/72* (2006.01)
*B66B 23/00* (2006.01)
*B66C 23/00* (2006.01)
*B61D 15/00* (2006.01)
*B61D 47/00* (2006.01)
*B60P 3/06* (2006.01)

(52) U.S. Cl.
CPC .............. *F16M 3/00* (2013.01); *B66C 23/00* (2013.01); *B66C 23/72* (2013.01); *F16M 5/00* (2013.01); *B60P 3/06* (2013.01); *B61D 15/00* (2013.01); *B61D 47/00* (2013.01); *F16M 2200/08* (2013.01)

(58) Field of Classification Search
CPC ........ F16M 3/00; F16M 5/00; F16M 2200/08; B66C 23/00; B66C 23/72; B60P 3/06; B61D 15/00; B61D 47/00
USPC ......... 248/647; 188/32, 36; 180/9.48; 410/3, 410/30; 104/137; 414/339, 343, 800; 105/7, 458; 212/294; 238/14
See application file for complete search history.

(56) References Cited

U.S. PATENT DOCUMENTS

| 1,731,911 | A | 10/1929 | Sayers et al. |
| 2,906,212 | A | 9/1959 | Hayes |
| 3,021,016 | A | 2/1962 | Noll et al. |
| 3,145,805 | A | 8/1964 | Kammueller et al. |

(Continued)

OTHER PUBLICATIONS

International Searching Authority, International Search Report PCT/US2017/032471, dated Aug. 2, 2017.

*Primary Examiner* — Tan Le
(74) *Attorney, Agent, or Firm* — Scott T. Griggs; Griggs Bergen LLP

(57) ABSTRACT

A securement for crawler cranes and system and method for use of the same are disclosed. In one embodiment of the system, a pair of structural securements are spaced at approximately a track-distance apart with respect to the crawler crane and coupled together by multiple transverse support members. When the crawler crane is driven onto the structural securements and fastened thereto, the tipping fulcrum of the crawler crane is shifted, thereby requiring a greater tipping force to tip and adding stability during high wind events.

20 Claims, 7 Drawing Sheets

(56) References Cited

U.S. PATENT DOCUMENTS

| | | | | |
|---|---|---|---|---|
| 3,501,031 | A | * | 3/1970 | Whitfield .............. B60P 1/5466 414/543 |
| 4,024,820 | A | | 5/1977 | Hlinsky et al. |
| 4,128,180 | A | * | 12/1978 | Mellious ................. E02F 3/964 180/68.6 |
| 4,508,232 | A | | 4/1985 | Lampson |
| 4,836,337 | A | | 6/1989 | Borrelli |
| 4,958,977 | A | * | 9/1990 | Snead .................... B61D 47/00 105/21 |
| 5,174,211 | A | * | 12/1992 | Snead .................... E01B 29/02 104/3 |
| 6,190,106 | B1 | * | 2/2001 | Richardson ............ B61D 47/00 414/333 |
| 7,364,044 | B2 | | 4/2008 | Hinata |
| 2005/0244255 | A1 | * | 11/2005 | Smith ...................... B66C 3/16 414/339 |

* cited by examiner

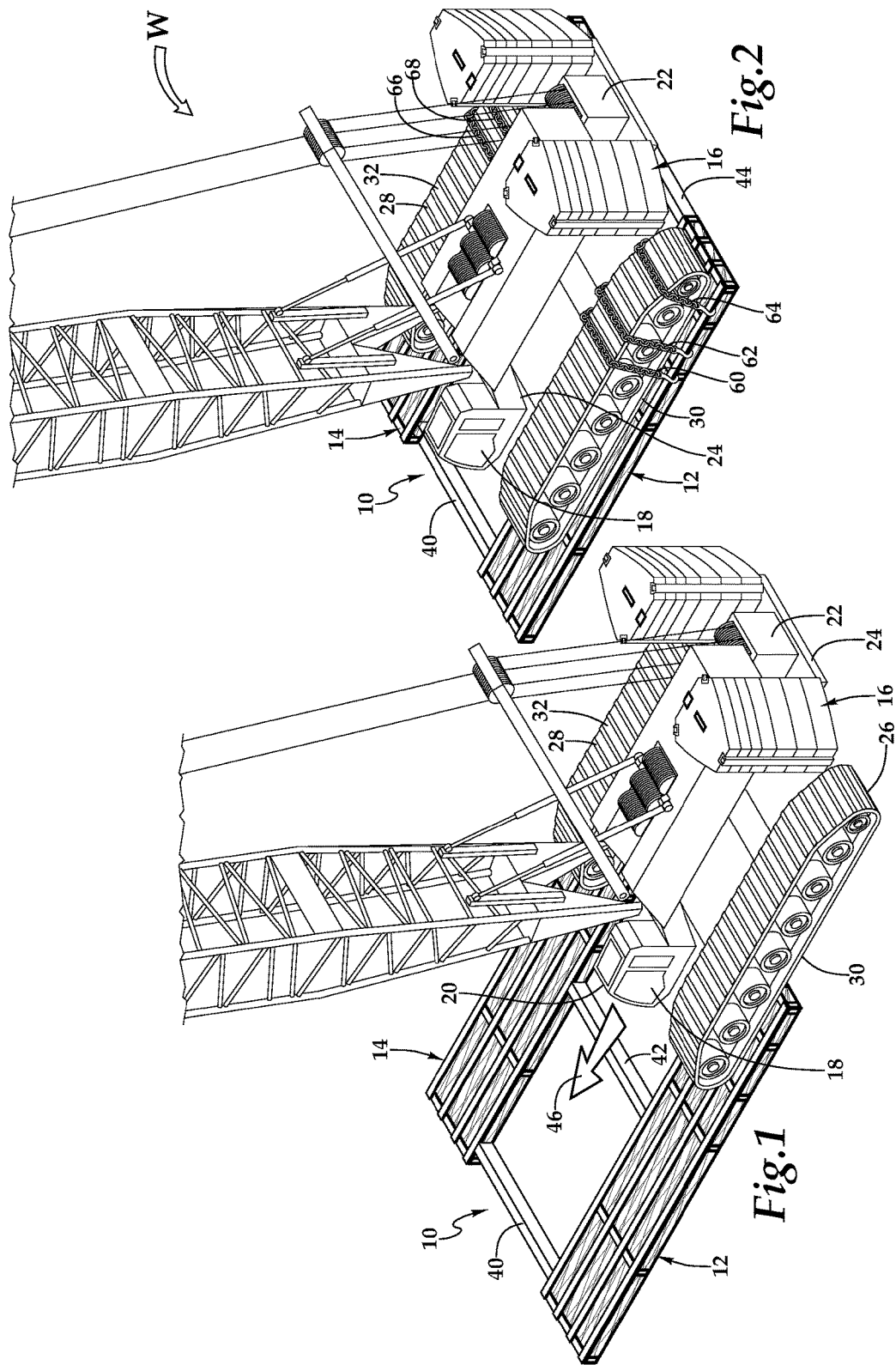

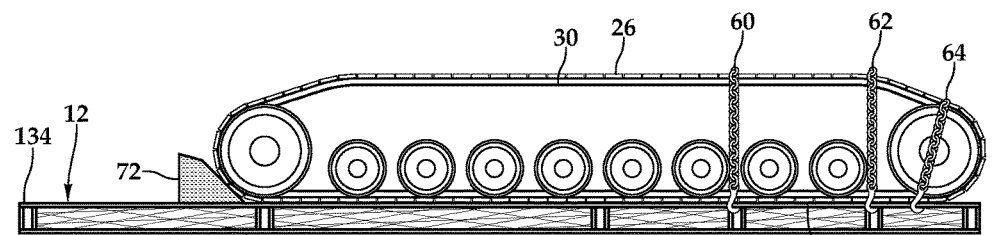
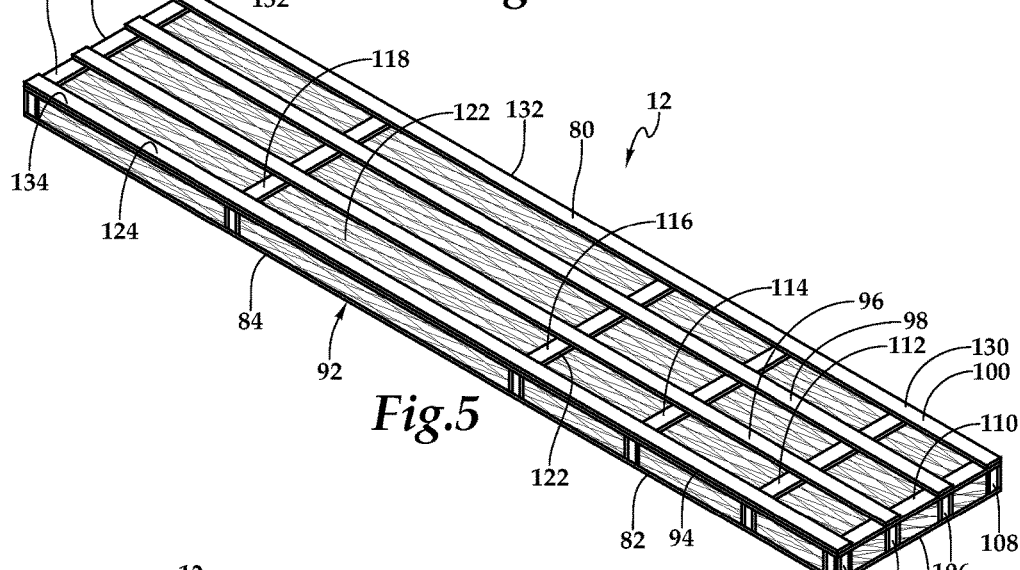
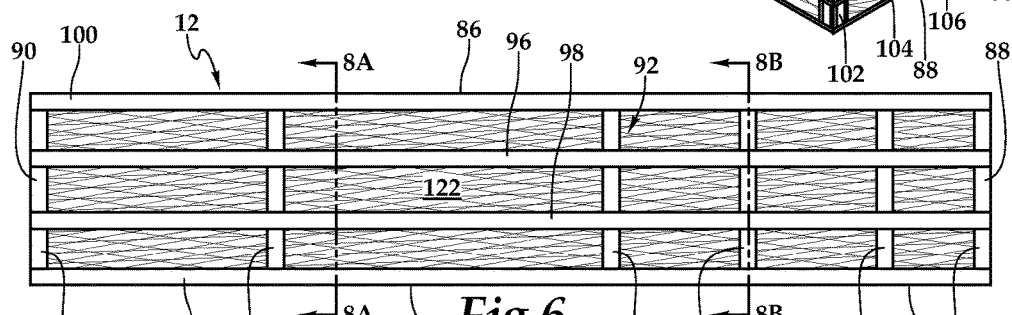
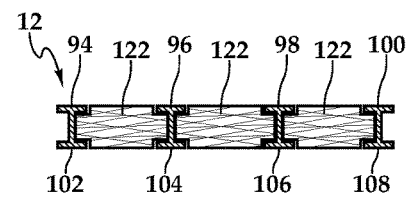
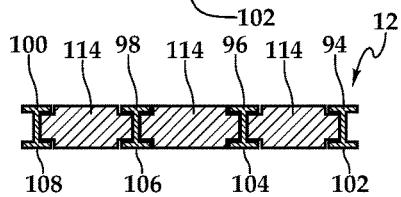

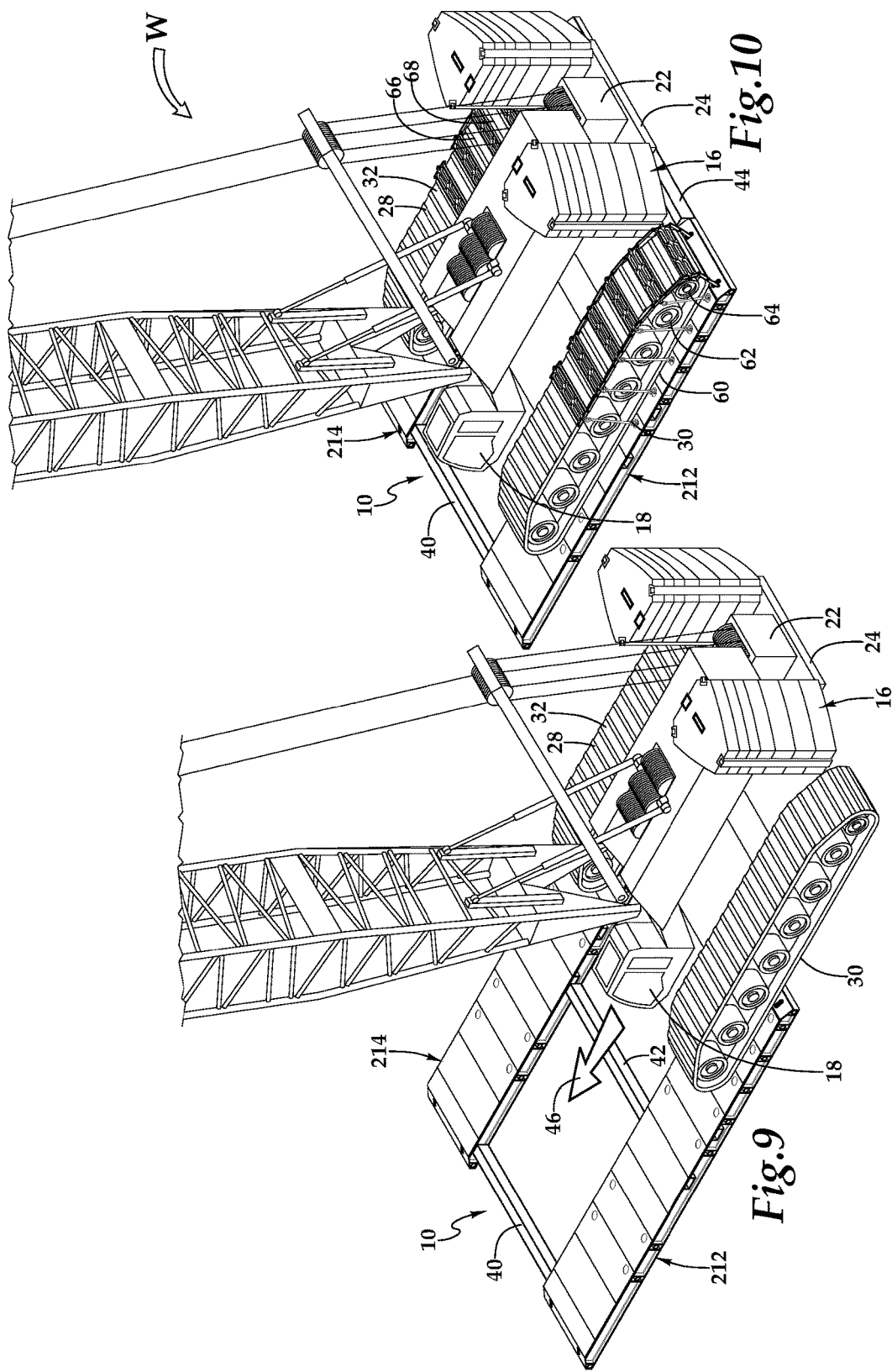

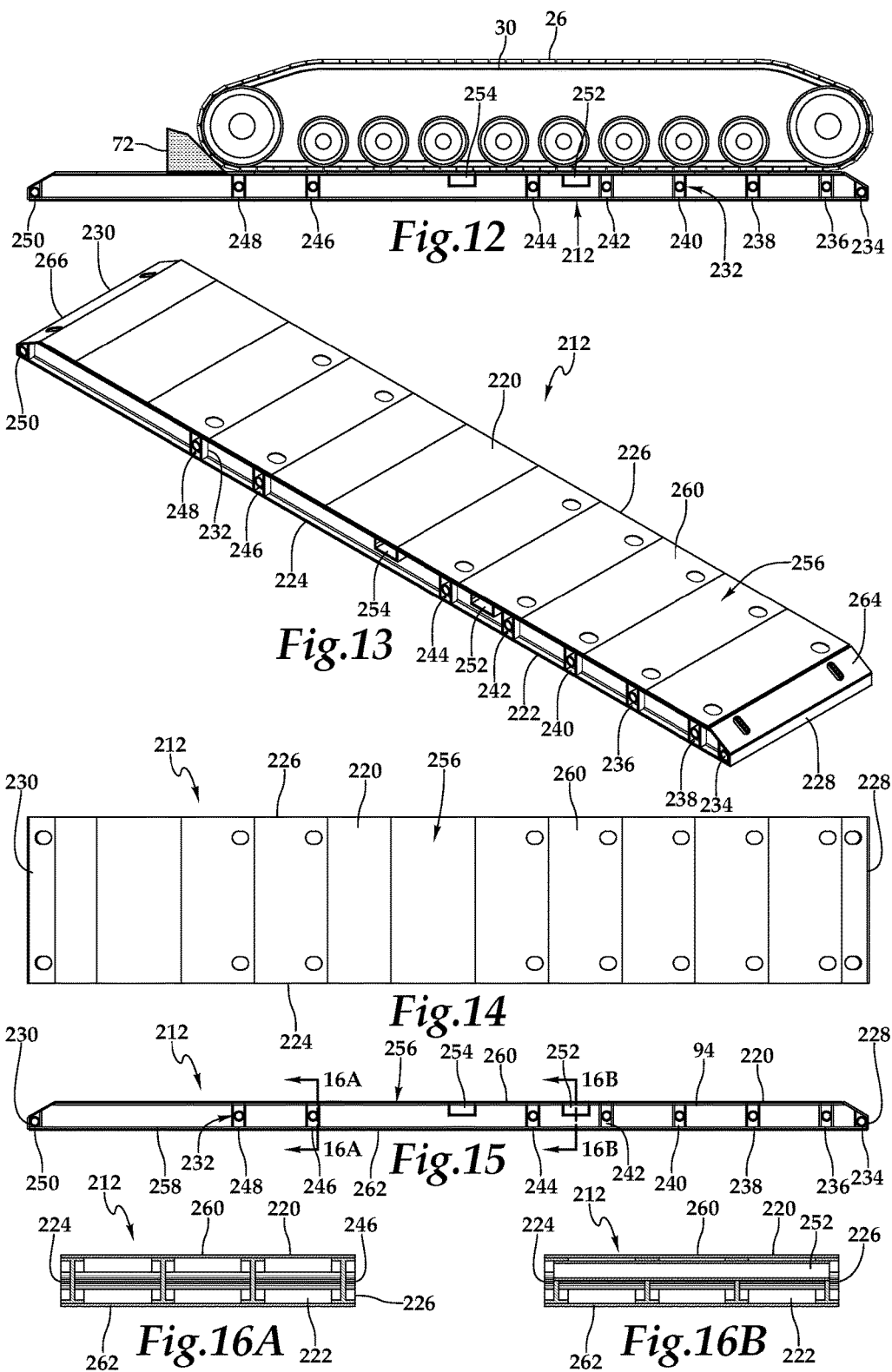

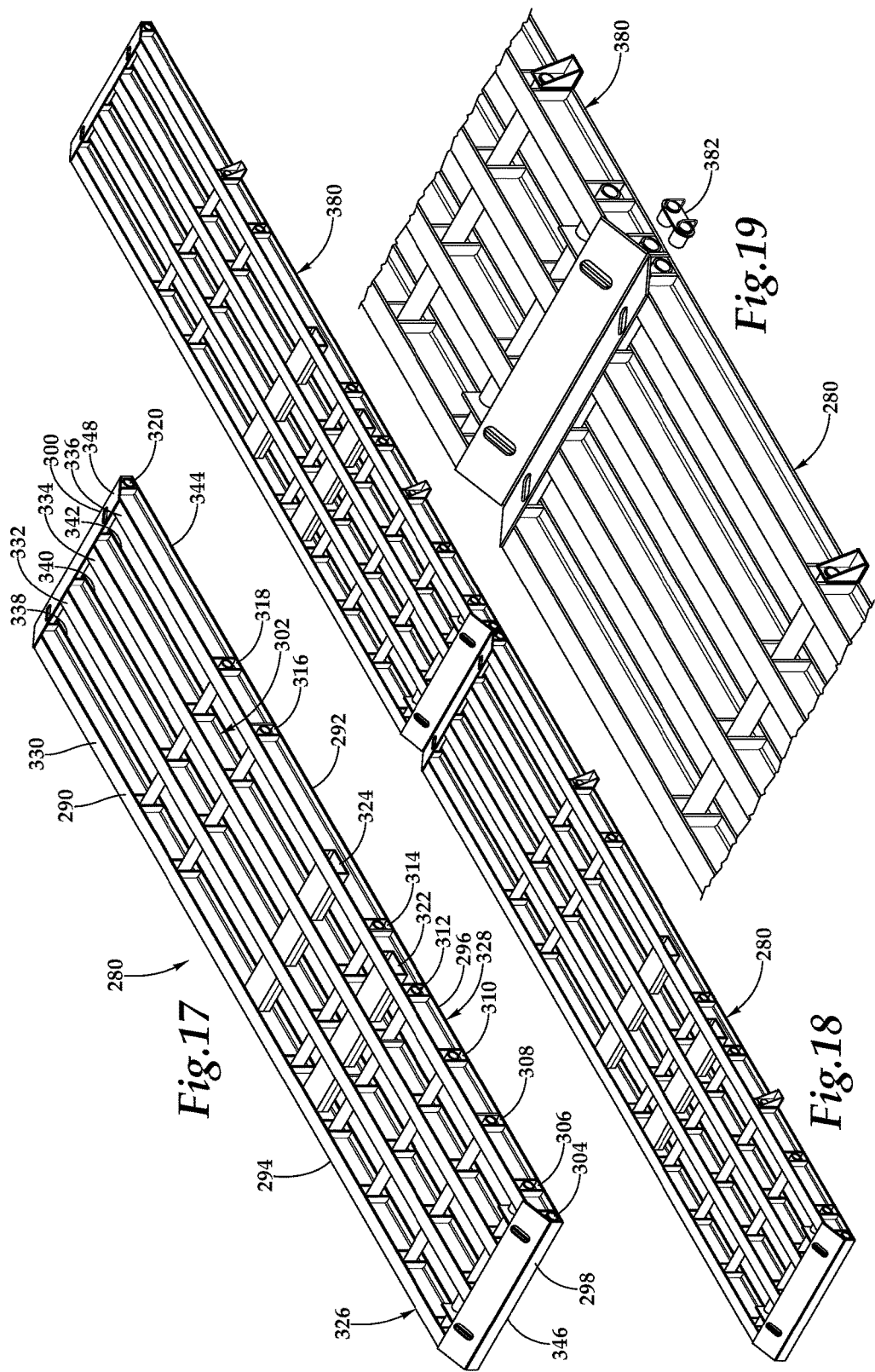

US 10,139,036 B2

SECUREMENT FOR CRAWLER CRANES AND SYSTEM AND METHOD FOR USE OF SAME

PRIORITY STATEMENT

This application claims priority from U.S. Patent Application Ser. No. 62/335,577 entitled "Securement for Crawler Cranes and System and Method for Use of Same," and filed on May 12, 2016 in the name of Jim D. Wiethorn; which is hereby incorporated by reference for all purposes.

TECHNICAL FIELD OF THE INVENTION

This invention relates, in general, to crawler cranes and, in particular, to a securement for crawler cranes and system and method for use of the same that enable crawler crane owners, users, and manufacturers to reduce the risk of catastrophic events and protect workers.

BACKGROUND OF THE INVENTION

Crane accidents resulting from high winds are very dramatic and very visible, often resulting in viral videos and media attention. Worse, crane accidents may cause property damage, injury, and even death. With respect to crawler cranes and wind resistance, existing solutions utilize guy wires to increase the stability of crawler cranes during high winds. Guy wire-based solutions, however, have proved time consuming to deploy and require an extremely technical analysis to work in varying wind conditions. As a result of limitations in existing technology, high winds remain a risk for conventional crawler cranes. Accordingly, there is a need for improved systems and methods for securing crawler cranes in high winds or during emergency lay-down operations. The addition of tipping resistance during high wind events can result in the difference between catastrophe or successful stowage of the boom.

SUMMARY OF THE INVENTION

It would be advantageous to mitigate the risks to conventional crawler cranes caused by high winds. It would also be desirable to enable a mechanical-based solution that is easily and quickly deployed without the need for a complex technical analysis. To better address one or more of these concerns, a securement for crawler cranes and system and method for use of the same are disclosed. In one embodiment of the system, a pair of structurally designed securements are spaced at approximately a track-distance apart with respect to the crawler crane and coupled together by multiple transverse support members. When the crawler crane is driven onto the securements and fastened thereto, the tipping fulcrum of the crawler crane is shifted, thereby requiring a greater tipping force to overturn, thereby adding stability during high wind events. An individual securement and a method, which accompanies the system, are also disclosed. This structurally designed enhancement, along with the securement method and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 1 is a rear perspective view depicting one embodiment of a system utilizing structural securements for a crawler crane, during the deployment of the structural securements, according to the teachings presented herein;

FIG. 2 is a rear perspective view depicting one embodiment of the system presented in FIG. 1 during use of the structural securements;

FIG. 4 is a side elevation view of a structural mat system depicted in FIG. 2, wherein only one track of the crawler crane is depicted for purposes of simplifying the illustration;

FIG. 5 is front perspective view of one embodiment of a structural securement for a crawler crane;

FIG. 6 is a top plan view of the structural securement for a crawler crane presented in FIG. 5;

FIG. 7 is a side elevation view of the structural securement for a crawler crane presented in FIG. 5;

FIG. 8A is a cross-sectional view of the structural securement for a crawler crane presented in FIG. 5 as viewed along line 8A-8A;

FIG. 8B is a cross-sectional view of the structural securement for a crawler crane presented in FIG. 5 as viewed along line 8B-8B;

FIG. 9 is a rear perspective view depicting another embodiment of a system utilizing structural securements for a crawler crane, during the deployment of the structural securements, according to the teachings presented herein;

FIG. 10 is a rear perspective view depicting one embodiment of the system presented in FIG. 9 during use of the structural securements;

FIG. 12 is a side elevation view of a structural mat system depicted in FIG. 10, wherein only one track of the crawler crane is depicted for purposes of simplifying the illustration;

FIG. 13 is front perspective view of one embodiment of a structural securement for a crawler crane;

FIG. 14 is a top plan view of the structural securement for a crawler crane presented in FIG. 13;

FIG. 15 is a side elevation view of the structural securement for a crawler crane presented in FIG. 13;

FIG. 16A is a cross-sectional view of the structural securement for a crawler crane presented in FIG. 15 as viewed along line 16A-16A;

FIG. 16B is a cross-sectional view of the structural securement for a crawler crane presented in FIG. 15 as viewed along line 16B-16B;

FIG. 17 is a front perspective view of a still further embodiment of a structural securement for a crawler crane;

FIG. 18 is a front perspective view of one embodiment of two structural securements depicted in FIG. 17 for a crawler crane being coupled together; and FIG. 19 is a front perspective view of the two structural securements depicted in FIG. 18 with the coupling detailed.

DETAILED DESCRIPTION OF THE INVENTION

Figure 3:
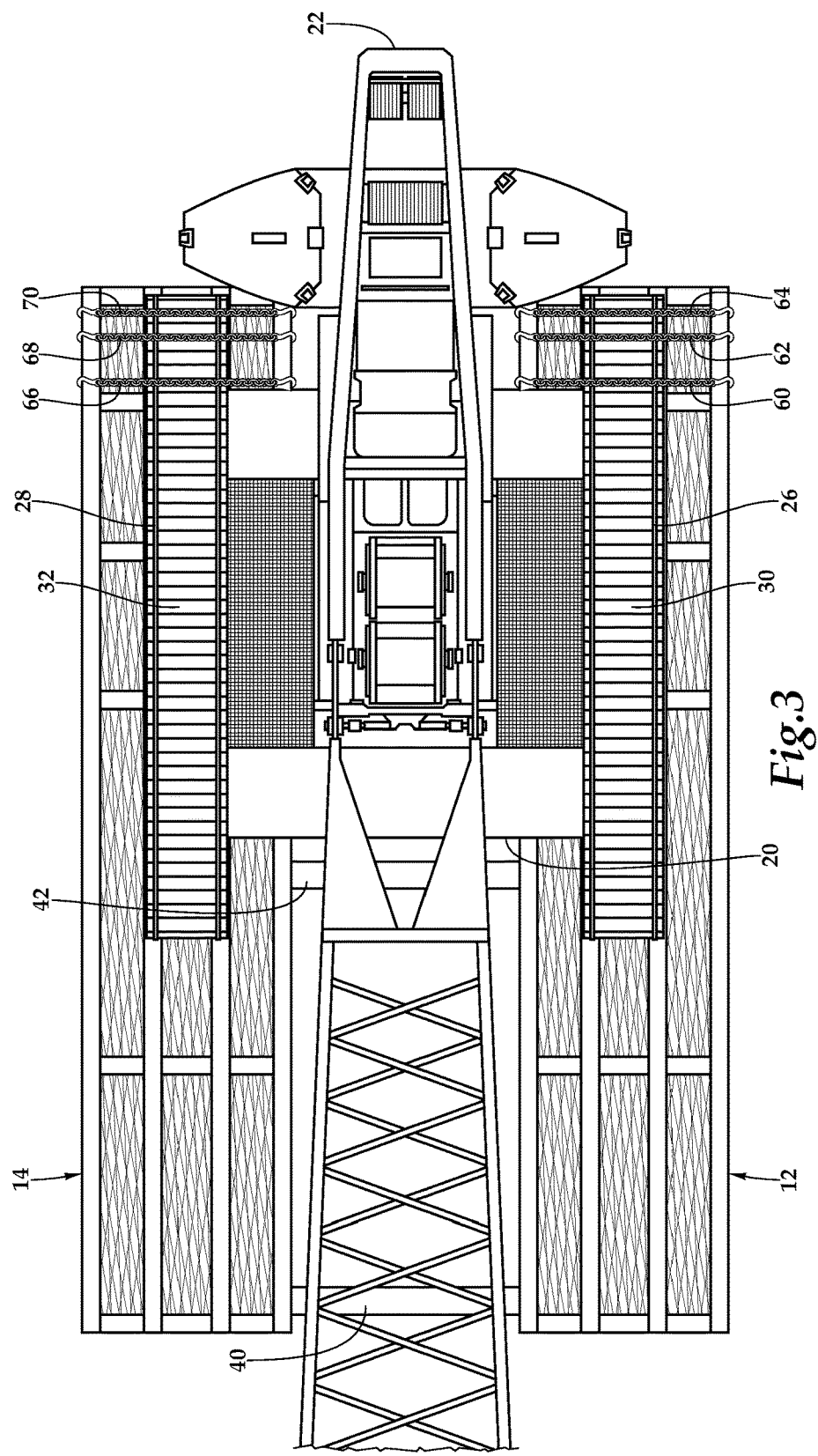
FIG. 3 is a top plan view of the system depicted in FIG. 2.

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of several specific ways to make and use the invention, and do not delimit the scope of the present invention.

Referring initially to FIG. 1, therein is depicted one embodiment of a system 10 utilizing structural securements 12, 14 for a crawler crane 16. As shown, the crawler crane 16 includes a crane 18 having a front 20 and a rear 22. The crane 18 may be utilized for hoisting, excavating and the like and is mounted on a lower undercarriage 24 with a set of parallel tracks 26, 28 having endless treads 30, 32 that provide stability and mobility to the crawler crane 16. As shown, the structural securements 12, 14 are deployed at approximately a track-distance apart with respect to the crawler crane. Thereafter, transverse support members 40, 42, 44 are located between the structural securement 12 and the structural securement 14 such that the structural securements 12, 14 are connected to each other. The crawler crane is then driven forward, as shown by arrow 46, onto the structural securements 12, 14 such that the rear 22 of the crawler crane 16 is approximate a rear edge of the structural securements 12, 14. One method of installation of the clamping tie-down system or shoes is to connect the tie-down system to the track and drive forward onto the structural mat for final securement as shown in FIG. 1.

Referring now to FIG. 2 through FIG. 4, in one embodiment, after the crawler crane 16 is completely driven forward onto the structural securements 12, 14, tie-downs 60, 62, 64, 66, 68, 70, which may be rods, flat bars or chains, for example, are employed around the parallel tracks 26, 28 and endless treads 30, 32 to secure the crawler crane 16 and particularly the rear 22 of the crawler crane 16 to the structural securements 12, 14. With this arrangement, the tipping fulcrum—the balance point around which there are equal moment arms of length times weight—of the crawler crane is extended toward the front of the structural securements 12, 14 thereby increasing the tipping resistance to wind or unbalance loading toward the front during laydown of the crane boom. As illustrated, the systems and methods herein may be deployed with the crawler crane 16 in response to a sudden increase in wind speed, as shown by arrow W, or in response to the crawler crane being taken out-of-service, under normal or emergency conditions, for example.

More particularly, use of crawler cranes in congested urban areas and highly volatile refinery operations restricts the capability of the operator to lay a crawler crane's boom down during out-of-service periods such as overnight. Further, when high winds suddenly impact a site the time to properly prepare for lowering the boom is limited and often attempted under emergency conditions. The systems and methods presented herein meet the need for a specialized mechanism that provides additional overturning resistance during emergency lowering procedures or while the crane boom is left erected after hours. With respect to service, cranes are generally set out-of-service with the boom over the front of the tracks, which are required to be chocked, and the boom is placed at an angle of less than 70 degrees. Tipping occurs when the wind forces on the boom creates sufficient load to overturn the crane over the front tips of the tracks. With the use of securements, by extending the tipping point beyond the front tips of the tracks provides additional resistance of overturning. As shown, to achieve this benefit, the rear tracks utilize a mechanism to provide hold-down resistance in concert with the extended tipping point. Additionally, as shown, the crawler crane 16 is held in place by blocking member 72 at the track toe for chocking.

Referring now to FIG. 5 through FIG. 8B, the structural securement 12 includes a top 80, a bottom 82, a left side 84, a right side 86, and ends 88, 90. A structural mat subsystem 92 is provided having four wide flange beams represented as beam portions 94, 96, 98, 100, 102, 104, 106, 108 welded together with cross structural steel pipe members 110, 112, 114, 116, 118, 120 such that openings, such as openings 122, 124, are formed between the wide flange beams 94, 96, 98, 100, 102, 104, 106, 108 and crossbar members 110, 112, 114, 116, 118, 120. Structural support members, such as wooden timbers 122, are secured between the openings in the mat subsystem 92. As will be presented hereinbelow, in another embodiment, steel plates can be secured to the top and bottom of the structural steel mat. In one implementation, the structural mat subsystem 92 may have a width greater than one of the parallel tracks 26, of the crawler crane 16. Also, the structural mat subsystem 92 may have a length greater than one of the parallel tracks 26, 28 of the crawler crane 16 by at least ten feet. As illustrated, the structural mat subsystem 92 may have from the end 88 to the end 90, a tie down region 130, an original crawler crane region 132, and an enhanced crawler crane region 134.

The structural mat subsystem 92 includes a height configured to accept the crawler crane 16 in forward drive thereon on the end 88. The tie down region 130 has multiple surfaces for accepting the tie-downs, such as tie downs 60, 62, 64, 66, 68, 70. As previously discussed, with respect to the structural securements 12, 14, the enhanced crawler crane region 134 in combination with the original crawler crane region 132, and the tie down region 130 shifts the tipping fulcrum of the crawler crane 16 toward the end 90 of the structural securement 12 when the crawler crane 16 is driven thereon.

Alternate combinations of wide flange beams may be implemented. Eight wide flange beams can be utilized instead of four 40-foot-long steel wide flange beams. Five or six crossbar members may be utilized in this implementation. Further, the wooden timbers may be solid infield wooden oak timbers or steel plates top and bottom depending on the application. At the ends, in one embodiment, lifting slots may be provided enabling handling of the structural securement 12 by a conventional crane. Alternatively, slotted channels specifically placed around the center of gravity of the structural mat may be used by a forklift for handling. Further, multiple tie-down rings are provided at the end of the securement to provide for coupling of rigging, such as chains, bars or wire rope pendants, to secure the crawler crane to the securement. The structural mat subsystem 92 may include a width of approximately eight feet. In one embodiment, the mat subsystem may include a length of approximately 40 feet. Also the structural mat subsystem may include a length greater than one of the tracks by at least ten feet or approximately ten to approximately 15 feet.

Figure 11:
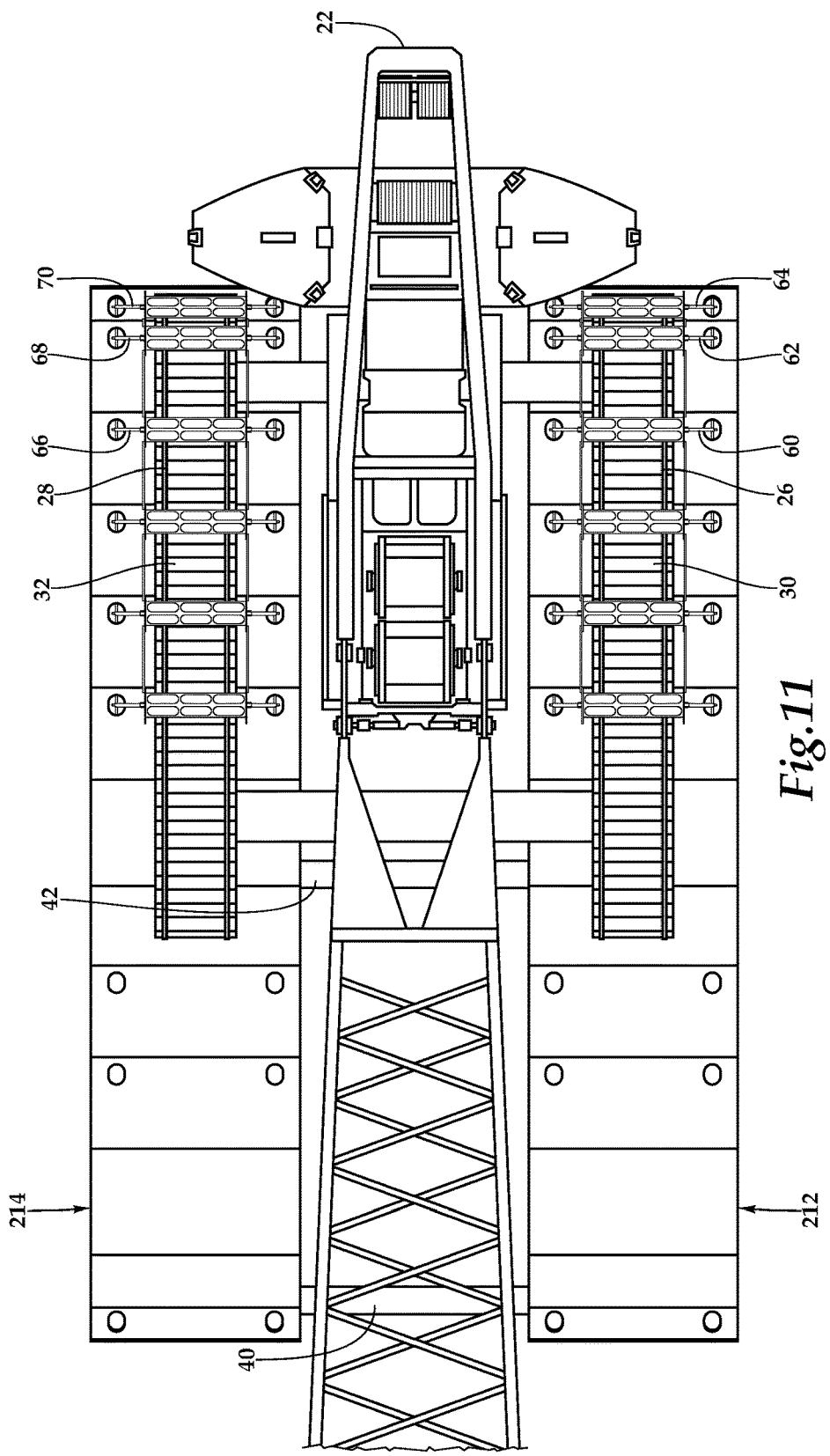
FIG. 11 is a top plan view of the system depicted in FIG. 10.

Referring now to FIG. 9, therein is depicted another embodiment of the system 10 utilizing structural securements 212, 214 for the crawler crane 16. As shown, the structural securements 212, 214 are deployed at approximately a track-distance apart with respect to the crawler crane. Thereafter, the transverse support members 40, 42, 44 are located between the structural securement 212 and the structural securement 214 such that the structural securements 212, 214 are connected to each other. The crawler crane is then driven forward, as shown by arrow 46, onto the structural securements 212, 214 such that the rear 22 of the crawler crane 16 is approximate a rear edge of the structural securements 212, 214. As shown in FIGS. 10, 11, and 12, after the crawler crane 16 is completely driven forward onto the structural securements 212, 214, tie-downs 60, 62, 64, 66, 68, 70, which, as discussed, may be rods, flat bars or chains, for example, are employed around the parallel tracks 26, 28 and endless treads 30, 32 to secure the crawler crane 16 and particularly the rear 22 of the crawler crane 16 to the structural securements 212, 214. It should be appreciated that the exact type and number of tie-downs will depend on the safety engineering of the particular application. Additionally, as shown, the crawler crane 16 is held in place by blocking member 72 at the track toe for chocking.

Referring now to FIG. 12 through FIG. 16B, the structural securement 212 includes a top 220, a bottom 222, a left side 224, a right side 226, and ends 228, 230. A structural mat subsystem 232 is provided having beam portions 234, 236, 238, 240, 242, 244, 246, 248, 250 and cross-beam portions 252, 254 welded together with structural support members 256, 258, which are depicted as upper and lower plates 260, 262. This embodiment may therefore provide steel wide flange members with top and bottom steel plates. Ramps 264, 266 are formed at each of the ends 228, 230. It should be appreciated that the structural mat systems presented herein are also designed to be secured to floating structures such as barges with the use of disposable mat tie-downs that are inserted into the ends of the crossbar pipes and welded to the barge deck. By way of example, in these implementations, subsequent installation of the crawler shoes are installed on each end of the tracks to hold meet OSHA requirements for tie-down on barges.

Referring now to FIG. 17, in another embodiment, a structural securement 280 includes a top 290, a bottom 292, a left side 294, a right side 296, and ends 298, 300. A structural mat subsystem 302 is provided having beam portions 304, 306, 308, 310, 312, 314, 316, 318, 320 and cross-beam portions 322, 324 welded together with structural support members 326, 328, which are depicted as upper support beams 330, 332, 334, 336 and lower support beams 338, 340, 342, 344. Ramps 346, 348 are formed at each of the ends 298, 300.

Referring now to FIGS. 18 and 19, the structural mat system is also designed for multiple mats to be connected at the ends to provide continuous support for travel over fill material or less than adequate soil conditions. As shown, structural securement 280 and a structural securement 380 are coupled together by a coupling 382. Further, it should be appreciated that a supplemental steel beam can also be added across the tailing ends of the structural mats to provide an under body connection to the front frame of a conventional hydraulic crane body to provide similar wind resistance to tipping as demonstrated for crawler cranes.

In operation, it should be appreciated that the embodiments of FIGS. 9 through 19 have substantially the same operational principles as the embodiments of FIGS. 1 through 8B. In particular, the tipping fulcrum—the balance point around which there are equal moment arms of length times weight—of the crawler crane 16 is extended toward the front of the structural securements 12, 14 or structural securements 212, 214 or structural securement 280 thereby increasing the tipping resistance to wind or unbalance loading toward the front during laydown of the crane boom. Further, as the various structural securements 12, 14, 212, 214, 280 demonstrate, the architecture and deployment of the system 10 may vary depending on the engineering application. As illustrated, the systems and methods herein may be deployed with the crawler crane 16 in response to a sudden increase in wind speed, as shown by arrow W, or in response to the crawler crane being taken out-of-service, under normal or emergency conditions, for example.

The order of execution or performance of the methods and techniques illustrated and described herein is not essential, unless otherwise specified. That is, elements of the methods and techniques may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A system for securing a crawler crane having a crane mounted to an undercarriage with a set of parallel tracks having endless treads, the system comprising:
   first and second structural securements spaced at approximately a track-distance apart with respect to the crawler crane, each of the first and second structural securements including:
      a structural mat subsystem having four wide flange beams welded together with a plurality of crossbar members such that openings are formed between the wide flange beams and crossbar members,
      a plurality of structural support members secured proximate the openings,
      the structural mat subsystem having a first end and a second end,
      the structural mat subsystem having a width greater than one of the tracks of the crawler crane,
      the structural mat subsystem having a length greater than one of the tracks of the crawler crane by at least ten feet, the structural mat subsystem having from the first end to the second end, a tie down region, an original crawler crane region, and an enhanced crawler crane region,
      the structural mat subsystem having a height configured to accept the crawler crane in forward drive thereon on the first end, and
      the tie down region having a plurality of surfaces for accepting a plurality of tie-downs; and
   a plurality of transverse support members coupling the first structural securement to the second structural securement such that the first and second structural securements are spaced at approximately the track-distance apart,
   wherein with respect to the first and second securements, the enhanced crawler crane region in combination with the original crawler crane region, and the tie down region shift the tipping fulcrum of the crawler crane toward the second end of the securement when the crawler crane is driven thereon.

2. The system as recited in claim 1, wherein the four wide flange beams further comprise four wide flange steel beams.

3. The system as recited in claim 1, wherein the structural mat subsystem further comprises a width of approximately eight feet.

4. The system as recited in claim 1, wherein the structural mat subsystem further comprises a length of approximately 40 feet.

5. The system as recited in claim 1, wherein the structural mat subsystem further comprises a length greater than one of the tracks by approximately ten to approximately 15 feet.

6. The system as recited in claim 1, wherein the plurality of crossbar members further comprise a plurality of crossbar structural pipe members.

7. The system as recited in claim 1, wherein the plurality of structural support members further comprise a plurality of wooden timbers.

8. The system as recited in claim 1, wherein the plurality of structural support members further comprise a plurality of steel wide flange members.

9. The system as recited in claim 1, wherein the plurality of structural support members further comprise a plurality of steel wide flange members with upper and lower plates.

10. A system for securing a crawler crane having a crane mounted to an undercarriage with a set of parallel tracks having endless treads, the system comprising:
    first and second structural securements spaced at approximately a track-distance apart with respect to the crawler crane, each of the first and second structural securements including:
        a structural mat subsystem having four wide steel flange beams welded together with a plurality of crossbar members such that openings are formed between the wide flange beams and crossbar members,
        a plurality of structural support members secured between the openings,
        the structural mat subsystem having a first end and a second end,
        the structural mat subsystem having a width greater than one of the tracks of the crawler crane, the width being approximately eight feet,
        the structural mat subsystem having a length greater than one of the tracks of the crawler crane by at least ten feet, the structural mat subsystem having from the first end to the second end, a tie down region, an original crawler crane region, and an enhanced crawler crane region, the length being approximately 40 feet,
        the structural mat subsystem having a height configured to accept the crawler crane in forward drive thereon on the first end, and
        the tie down region having a plurality of surfaces for accepting a plurality of tie-downs; and
    a plurality of transverse support members coupling the first structural securement to the second structural securement such that the first and second structural securements are spaced at approximately the track-distance apart,
    wherein with respect to the first and second structural securements, the enhanced crawler crane region in combination with the original crawler crane region, and the tie down region shift the tipping fulcrum of the crawler crane toward the second end of the securement when the crawler crane is driven thereon.

11. The system as recited in claim 10, wherein the structural mat subsystem further comprises a length greater than one of the tracks by approximately ten to approximately 15 feet.

12. The system as recited in claim 10, wherein the plurality of crossbar members further comprise a plurality of crossbar structural pipe members.

13. The system as recited in claim 10, wherein the plurality of structural support members further comprise a material selected from the group consisting of wooden timbers and steel wide flange members.

14. The system as recited in claim 10, wherein the plurality of structural support members further comprise a steel wide flange members with upper and lower plates.

15. A method for securing a crawler crane having a crane mounted to an undercarriage with a set of parallel tracks having endless treads, the method comprising:
    providing first and second structural securements spaced at approximately a track-distance apart with respect to the crawler crane, each of the first and second structural securements including:
        a structural mat subsystem having four wide flange beams welded together with a plurality of crossbar members such that openings are formed between the wide flange beams and crossbar members,
        a plurality of structural support members secured between the openings,
        the structural mat subsystem having a first end and a second end,
        the structural mat subsystem having a width greater than one of the tracks of the crawler crane,
    the structural mat subsystem having a length greater than one of the tracks of the crawler crane by at least ten feet, the structural mat subsystem having from the first end to the second end, a tie down region, an original crawler crane region, and an enhanced crawler crane region,
        the structural mat subsystem having a height configured to accept the crawler crane in forward drive thereon on the first end, and
        the tie down region having a plurality of surfaces for accepting a plurality of tie-downs; and
    coupling a plurality of transverse support members between the first structural securement and the second structural securement such that the first and second structural securements are spaced at approximately the track-distance apart,
    driving the crawler crane forward onto the first and second structural securements such that a rear of the crawler crane is approximate the first ends of the first and second structural securements;
    securing the crawler crane to the first and second structural securements with a plurality of tie-downs around the parallel tracks;
    extending the tipping fulcrum of the crawler crane toward the second end of the securement.

16. The method as recited in claim 15, wherein driving the crawler crane further comprises driving the crawler crane in response to a sudden increase in wind speed.

17. The method as recited in claim 15, wherein driving the crawler crane further comprises driving the crawler crane in response to the crawler crane being taken out-of-service.

18. The method as recited in claim 15, wherein providing first and second structural securements spaced at approximately a track-distance apart with respect to the crawler crane, including the plurality of crossbar members, further comprises providing a plurality of crossbar structural pipe members.

19. The method as recited in claim 15, wherein providing first and second structural securements spaced at approximately a track-distance apart with respect to the crawler crane, including the plurality of structural support members, further comprises providing a material selected from the group consisting of wooden timbers and steel wide flange members.

20. The method as recited in claim 15, wherein providing first and second structural securements spaced at approximately a track-distance apart with respect to the crawler crane, including the plurality of structural support members, further comprises providing a steel wide flange members with upper and lower plates.

* * * * *